United States Patent
Kim et al.

(10) Patent No.: US 9,800,546 B2
(45) Date of Patent: Oct. 24, 2017

(54) ONE-WAY GATEWAY, AND VEHICLE NETWORK SYSTEM AND METHOD FOR PROTECTING NETWORK WITHIN VEHICLE USING ONE-WAY GATEWAY

(71) Applicant: ELECTRONICS AND TELECOMMUNICATIONS RESEARCH INSTITUTE, Daejeon (KR)

(72) Inventors: Kyoung-Ho Kim, Gokseong-gun (KR); Jeong-Han Yun, Daejeon (KR); Heemin Kim, Daejeon (KR); Manhyun Chung, Daejeon (KR); Woonyon Kim, Daejeon (KR); Sangwoo Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 82 days.

(21) Appl. No.: 14/934,251

(22) Filed: Nov. 6, 2015

(65) Prior Publication Data

US 2016/0261561 A1    Sep. 8, 2016

(30) Foreign Application Priority Data

Mar. 4, 2015    (KR) .................. 10-2015-0030167

(51) Int. Cl.
*H04L 29/06* (2006.01)
*H04L 29/08* (2006.01)
*H04L 12/66* (2006.01)

(52) U.S. Cl.
CPC .............. *H04L 63/02* (2013.01); *H04L 67/12* (2013.01); *H04L 12/66* (2013.01)

(58) Field of Classification Search
CPC . H04L 63/02; H04L 63/0209; H04L 63/0227; H04L 63/0236; H04L 63/10;
(Continued)

(56) References Cited

U.S. PATENT DOCUMENTS

| 8,817,706 B2 | 8/2014 | Ichihara |
| 2013/0212659 A1 | 8/2013 | Maher et al. |

(Continued)

FOREIGN PATENT DOCUMENTS

| JP | 2010-188913 A | 9/2010 |
| JP | 2014-140096 A | 7/2014 |

(Continued)

OTHER PUBLICATIONS

Groll et al., Secure and Authentic Communication on Existing In-Vehicle Networks, IEEE, 2009.*

(Continued)

*Primary Examiner* — Minh Dinh
(74) *Attorney, Agent, or Firm* — LRK Patent Law Firm

(57) ABSTRACT

A one-way gateway and a vehicle network system and method for protecting networks within a vehicle using the one-way gateway. The one-way gateway includes a communication control unit, a physical one-way communication unit, and a data transmission/reception unit. The communication control unit takes charge of communication with a device of the internal network or infortainment network of a vehicle. The physical one-way communication unit configures a communication section between the internal network and the infortainment network in a physically one-way form. The data transmission/reception unit transfers data, transmitted by the device of the internal network or infortainment network, to the physical one-way communication unit via the communication control unit, and transfers data, (Continued)

received via the physical one-way communication unit, to the device of the internal network or infortainment network.

13 Claims, 7 Drawing Sheets

(58) Field of Classification Search
CPC ... H04L 63/101; H04L 63/14; H04L 63/1408; H04L 67/12; H04L 12/66
See application file for complete search history.

(56) References Cited

U.S. PATENT DOCUMENTS

| | | |
|---|---|---|
| 2014/0215609 A1 | 7/2014 | Fukami et al. |
| 2015/0020152 A1 | 1/2015 | Litichever et al. |

FOREIGN PATENT DOCUMENTS

| | | | |
|---|---|---|---|
| JP | 2014-146087 A | 8/2014 | |
| KR | 10-2013-0136852 A | 12/2013 | |
| WO | 2011/055425 A1 | 5/2011 | |

OTHER PUBLICATIONS

Kleberger et al., Security Aspects of the In-Vehicle Network in the Connected Car, IEEE, 2011.*
Weimerskirch, Automotive and Industrial Data Security, 2012.*
Wolf et al., Secure In-Vehicle Communication, Springer, 2006.*
"Hacking Cars with MP3 Files—Schneier on Secuirty", Blog, 2011, URL:https://www.schneier.com/blog/archives/2011/03/hacking_cars_wi.html.

* cited by examiner

ONE-WAY GATEWAY, AND VEHICLE NETWORK SYSTEM AND METHOD FOR PROTECTING NETWORK WITHIN VEHICLE USING ONE-WAY GATEWAY

CROSS-REFERENCE TO RELATED APPLICATION

This application claims the benefit of Korean Patent Application No. 10-2015-0030167, filed Mar. 4, 2015, which is hereby incorporated by reference herein in its entirety.

BACKGROUND

1. Technical Field

Embodiments of the present invention relate to a one-way gateway and a vehicle network system and method for protecting networks within a vehicle using the one-way gateway and, more particularly, to a one-way gateway that is capable of maintaining the security of a vehicle in any circumstance when operating, in conjunction with an external network to provide various convenient functions and collect data in the vehicle, and a vehicle network system and method for protecting networks within a vehicle using the one-way gateway.

2. Description of the Related Art

State-of-the-art devices, such as various machines/electronic devices, are clustered into a vehicle. The state-of-the-art devices include devices for acceleration, steering and braking, i.e., devices for the basic functions of a vehicle, as well as devices for various convenient functions.

Recently, as many parts of a vehicle have been digitized, an environment in which many functions can be performed has been established, and the needs of vehicle users tend to be gradually diversifying.

Representative needs of vehicle users include car navigation, the watching of digital multimedia broadcasts (DMB), listening to a radio, and the playback of music. Furthermore, technologies related to the control of a vehicle via an external device inside or outside the vehicle using Bluetooth, Wi-Fi and LTE have recently emerged in quick succession. However, the understanding of threats related to such technologies is insufficient. Accordingly, security measures are still quite poor, and security threats are increasing. It has been proved that the illegitimate control of a vehicle via an ODB terminal is possible.

A conventional vehicle network may be schematically illustrated as shown in FIG. 1 based on its functions.

The conventional vehicle network may be basically divided into an internal network 1 and an infotainment network 2. The internal network 1 chiefly includes devices related to the driving of a vehicle, such as an engine control module (ECM) 1a, a body control module (BCM) 1b, a transmission control module (TCM) 1c, and an anti-lock brake control module (ABCM) 1d. The infotainment network 2 includes devices related to the provision of information or user convenience, such as an audio radio 2a, a navigation system 2b, and a vehicle computer 2c. Furthermore, the conventional vehicle network uses a gateway 3 to handle communication between devices using different communication methods.

In the case of conventional vehicles, countermeasures against threats are very poor on the assumption that a vehicle network is an independent network without an external connection.

Recently, however, an external device is connected via an interface, such as a Bluetooth interface, included in the external communication 2d of FIG. 1. Accordingly, a penetration path to the vehicle network may be created. Furthermore, there is a possibility that the internal network 1 of the vehicle is influenced via the penetration path and thus the vehicle is defenselessly exposed to an attacker's malicious behavior.

A technology related to the present invention is disclosed in Korean Patent Application Publication No. 2013-0136852 entitled "CAN BUS separating apparatus and CAN communication security method using the same."

SUMMARY

At least some embodiments of the present invention are directed to the provision of a one-way gateway that applies a limited physical one-way communication technology to the internal network and infotainment network of a vehicle, thereby fundamentally blocking a threat intended to illegitimately control a vehicle through external malicious behavior and also smoothly providing existing associated information, and a vehicle network system and method for protecting networks within a vehicle using the one-way gateway.

In accordance with an aspect of the present invention, there is provided a one-way gateway, including: a communication control unit configured to take charge of communication with a device of the internal network or infotainment network of a vehicle; a physical one-way communication unit adapted to configure a communication section between the internal network and the infotainment network in a physically one-way form; and a data transmission/reception unit configured to transfer data, transmitted by the device of the internal network or infotainment network, to the physical one-way communication unit via the communication control unit, and to transfer data, received via the physical one-way communication unit, to the device of the internal network or infotainment network.

The physical one-way communication unit may include: a one-way transmission control unit configured to receive the data from the device of the internal network and output the received data; a physical one-way data transmission unit configured to receive the data from the one-way transmission control unit via one-way communication and output the received data; a physical one-way data reception unit configured to receive the data from the physical one-way data transmission unit via the one-way communication and output the received data; and a one-way reception control unit configured to transfer the data from the physical one-way data reception unit to the device of the infotainment network.

When one-way data communication is performed between the physical one-way data transmission unit and the physical one-way data reception unit, a physical line between the physical one-way data transmission unit and the physical one-way data reception unit may be removed.

The physical one-way data reception unit may transmit a reception state checking signal to the physical one-way data transmission unit as the data is received from the physical one-way data transmission unit.

The physical one-way data transmission unit may check whether the physical one-way data reception unit has normally received the data based on the reception state checking signal.

The one-way gateway may further include: a signal transmission unit configured to determine whether a request is normal when the request is received from the device of the infotainment network via the one-way reception control unit and output a reception state checking signal based on the result of the determination; and a signal reception unit configured to determine whether the request is normal based on the reception state checking signal from the signal transmission unit and transmit the request to the one-way transmission control unit if the request, is normal.

The one-way reception control unit may determine whether the request is normal when the request is received from the device of the infotainment network and transfer the request to the signal transmission unit; and the one-way transmission control unit may receive the request from the signal reception unit, may determine whether the request is normal, and may transfer the request to the device of the internal, network.

In accordance with another aspect of the present invention, there is provided a vehicle network system, including: an internal network of a vehicle; the infotainment network of the vehicle; and a one-way gateway configured to perform only the transmission of data from the internal network to the infotainment network through one-way communication, to receive a request transmitted from the infotainment network, to the internal network, and to transmit only a normal request to the internal network.

In accordance with still another aspect of the present invention, there is provided a method of protecting networks within a vehicle, including: transferring, by the one-way transmission control unit of a one-way gateway, data from a device of an internal network to the physical one-way data transmission unit of the one-way gateway; transferring, by the physical one-way data transmission unit, the received data to the physical one-way data reception unit of the one-way gateway through one-way communication; transferring, by the physical one-way data reception unit, the data from the physical one-way data transmission unit to the one-way reception control unit of the one-way gateway; and transferring, by the one-way reception control unit, the data from the one-way reception control unit to a device of an infotainment network.

Transferring the received data to the physical one-way data reception unit may include removing a physical line between the physical one-way data transmission unit and the physical one-way data reception unit.

The method may further include, between transferring the received data to the physical one-way data reception unit and transferring the data to the one-way reception control unit, transmitting, by the physical one-way data reception unit, a reception state checking signal to the physical one-way data transmission unit as the physical one-way data reception unit receives the data from the physical one-way data transmission unit.

The method may further include checking, by the physical one-way data transmission unit, whether the physical one-way data reception unit has normally received data based, on the reception state checking signal.

The method may further include: determining, by the signal transmission unit of the one-way gateway, whether a request is normal as the request is received from the device of the infotainment network via the one-way reception control unit; outputting, by the signal transmission unit, a reception state checking signal based on the result of the determination; determining, by the signal reception unit of the one-way gateway, whether the request is normal based on the reception state checking signal of the signal transmission unit; and transferring, by the signal reception unit, the request to the one-way transmission control unit if the request is normal.

The method may further include, before determining whether the request is normal as the request is received from the device of the infotainment network: determining, by the one-way reception control unit, whether a request is normal as the request is received from the device of the infotainment network; and transferring the request to the signal transmission unit.

The method may further include, after transferring the request to the one-way transmission control unit if the request is normal: receiving, by the one-way transmission control unit, the request from the signal reception unit; determining whether the request is normal; and transferring the request to the device of the internal network.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
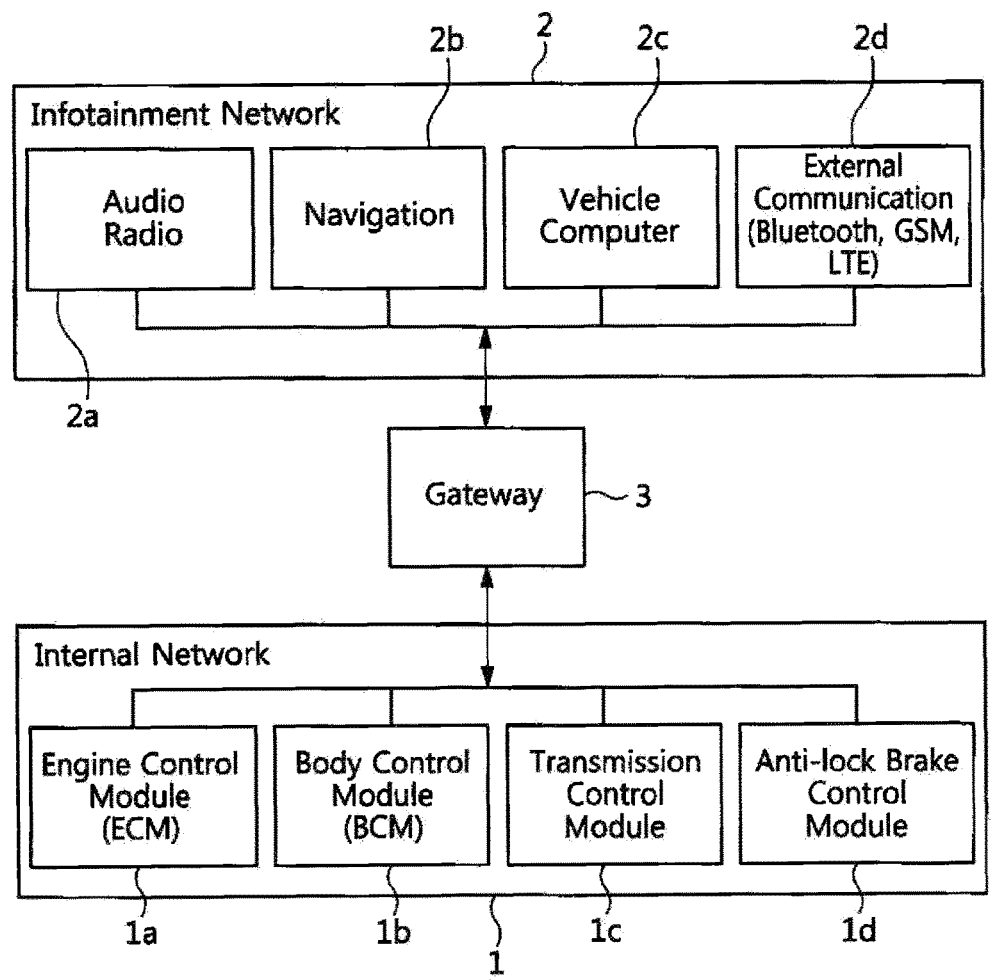
FIG. 1 is a diagram showing a conventional vehicle network system.

The present invention may be modified in various ways and have various embodiments. Specific embodiments are shown in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and are not used to limit the present invention. A singular form may include a plural form unless otherwise defined. The terms, including "comprise," "includes," "comprising," "including" and their derivatives, specify the presence of described shapes, numbers, steps, operations, elements, parts and/or groups thereof, and do not exclude the possibility of the presence or addition of one or more other shapes, numbers, steps, operations, elements, parts, and/or groups thereof.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having meanings that are consistent with their meanings in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

Figure 2:
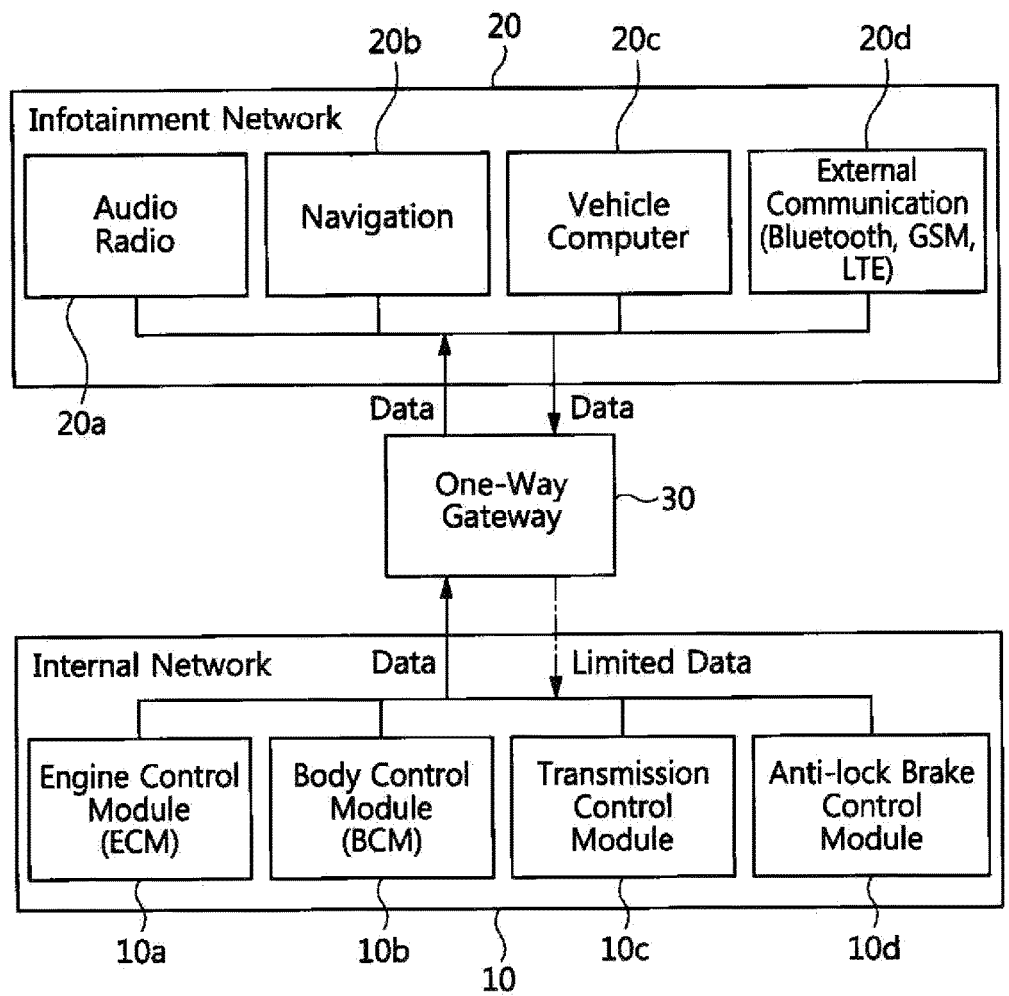
FIG. 2 is a diagram showing, a vehicle network system according to an embodiment of the present invention.

FIG. 2 is a diagram showing a vehicle network system according to an embodiment of the present invention.

In the conventional structure, an internal network and an infotainment network have a two-way communication structure in which they can exchange data via a gateway. For this reason, there is the possibility of an attack.

However, in a structure proposed by an embodiment of the present invention, data may be transmitted only from an internal network 10 to an external network, and an, infotainment network 20 receives data from the internal network 10 and transmits a request to the internal network 10.

In FIG. 2, a one-way gateway 30 supports communication between the internal network 10 and the infotainment network 20. Preferably, the one-way gateway 30 may support a one-way communication function.

Furthermore, the one-way gateway 30 receives a request transmitted from the infotainment network 20 to the internal network 10, and transmits only a predetermined normal request to the internal network 10 in a limited manner. Using this structure, an existing function can be supported because a limited request is transmitted to the internal network 10.

Furthermore, the one-way gateway 30 fundamentally blocks the possibility of penetration into the internal network 10 by blocking all data other than normally received data.

In FIG. 2, the configuration of the internal network 10 is the same as that of the internal network 1 of FIG. 1 other than reference numerals. Furthermore, the infotainment network 20 is the same, as the internal network 2 of FIG. 1, except for reference numerals.

Figure 3:
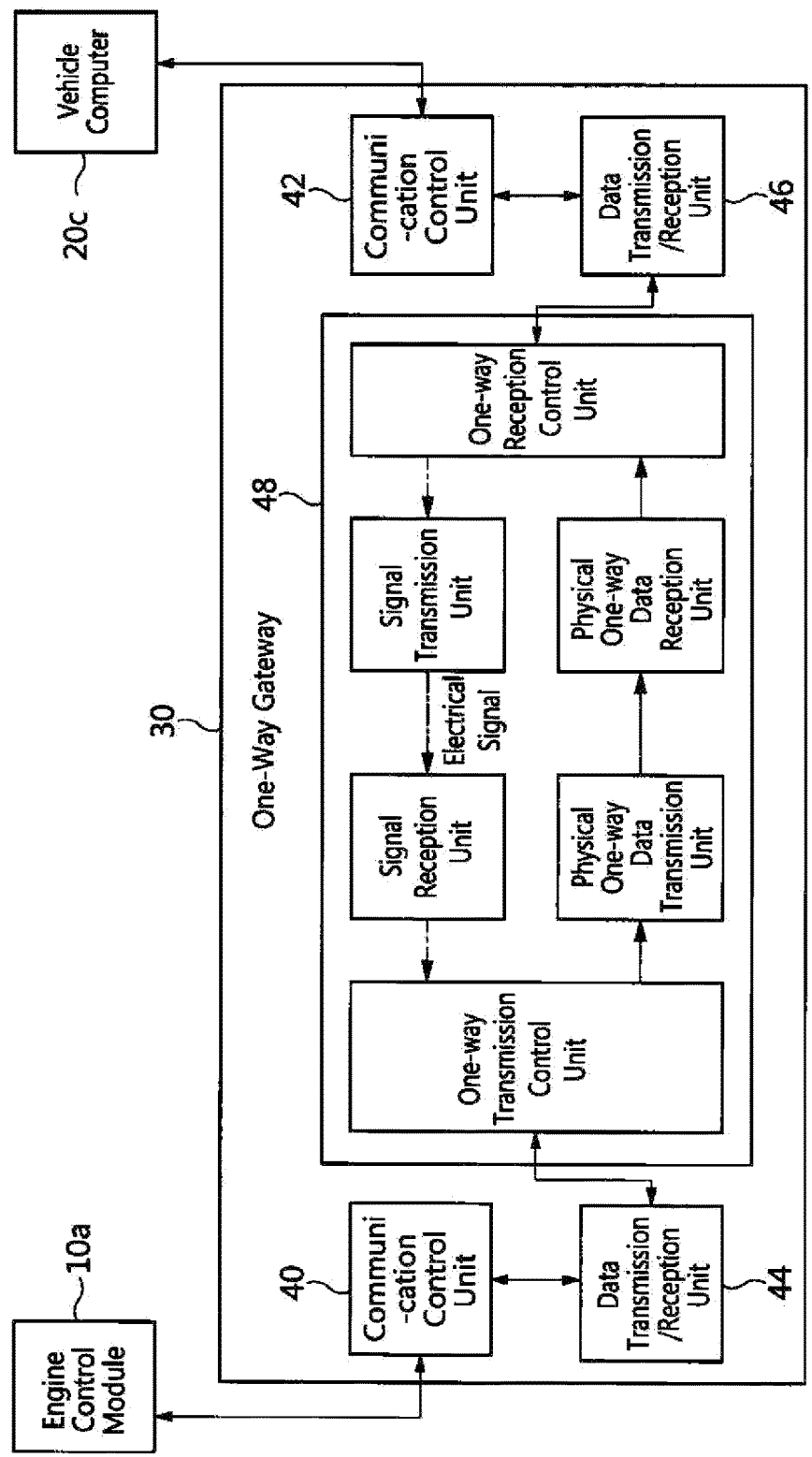
FIG. 3 is a diagram showing the configuration of a one-way gateway shown in FIG. 2.

FIG. 3 is a diagram showing the configuration of the one-way gateway shown in FIG. 2.

The one-way gateway 30 includes communication control units 40 and 42, data transmission/reception units 44 and 46, and a physical one-way communication unit 48.

The communication control units 40 and 42 take charge of communication with devices of the internal network 10 or infotainment network 20 connected to the communication control units 40 and 42. In this case, the communication control unit 40 is assumed to be connected to the device of the internal network 10, and the communication control unit 42 is assumed to be connected to the device of the infotainment network 20.

The data transmission/reception units 44 and 46 communicate with the communication control units 40 and 42. Furthermore, the data transmission/reception units 44 and 46 transfer data, transmitted by devices connected thereto, to the one-way transmission control unit or one-way reception control unit of the physical one-way communication unit 48, or transfer data, received via the one-way transmission control unit or one-way reception control unit of the physical one-way communication unit 48, to the devices connected to the data transmission/reception units 44 and 46.

In this case, the data transmission/reception unit 44 may be connected to a device of the internal network 10 via the communication control unit 40, and the data transmission/reception unit 46 may be connected to a device of the infotainment network 20 via the communication control unit 42. Accordingly, the data transmission/reception unit 44 may transfer data, transmitted by the connected device (e.g., the ECM 10a), to the one-way transmission control unit of the physical one-way communication unit 48, or may transfer data, received via the one-way transmission control unit of the physical one-way communication unit 48, to the connected device (e.g., the ECM 10a). The data transmission/reception unit 46 may transfer data, transmitted by the connected device (e.g., the vehicle computer 20c), to the one-way reception control, unit of the physical one-way communication unit 48, or may transfer data, received via the one-way reception control unit of the physical one-way communication unit 48, to the connected device (e.g., the vehicle computer 20c).

The physical one-way communication unit 48 counteracts an external threat by replacing a conventional two-way communication section with a physically one-way form.

Furthermore, in order to solve the problem in which it is impossible to become aware of the states of counterparts, which is a problem of the conventional one-way communication technology, the physical one-way communication unit 48 includes a signal transmission unit and a signal reception unit that transfer a state using a method, such as an electrical on/off method. Accordingly, data can be reliably transferred, and a limited request is made possible.

Figure 4:
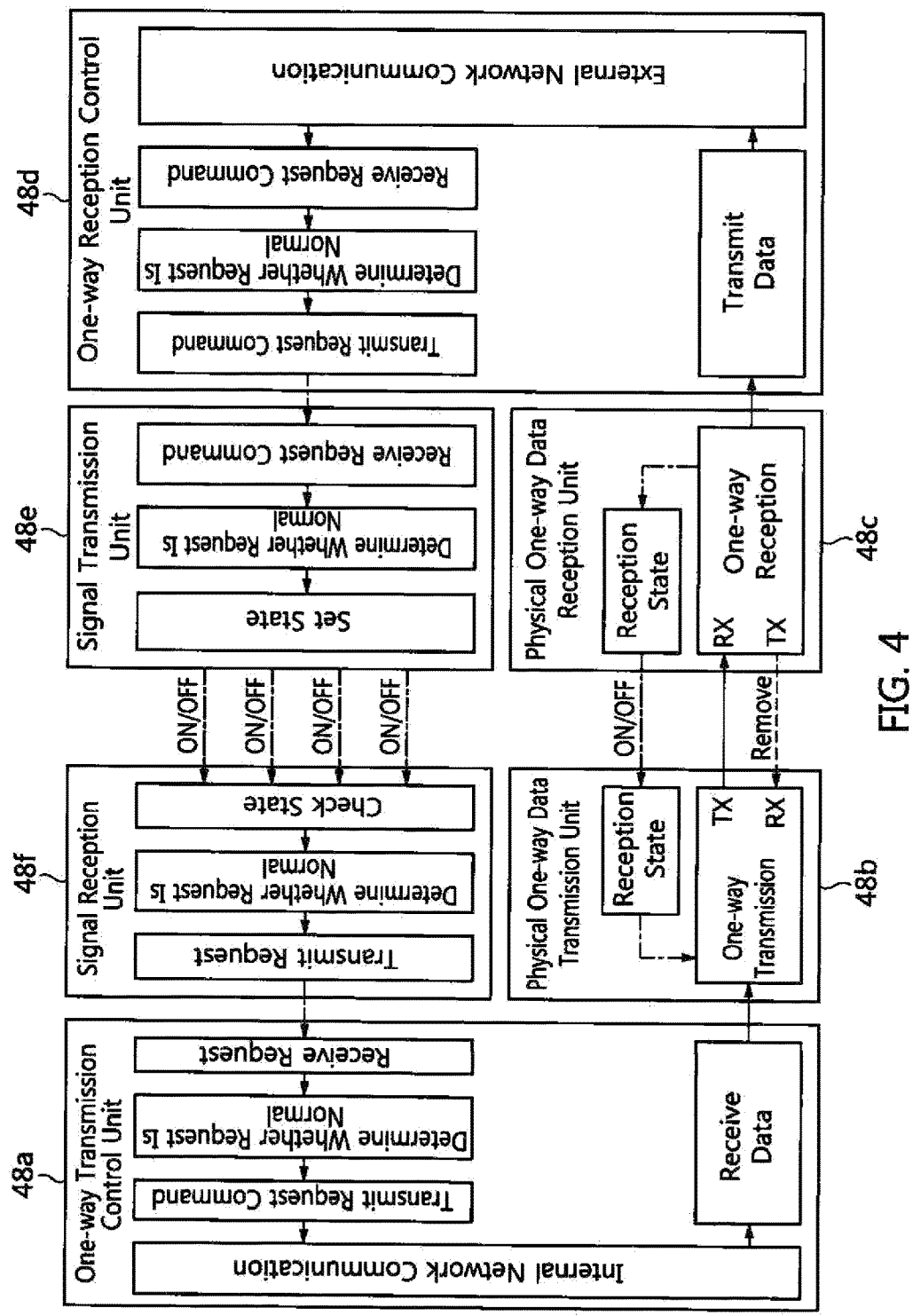
FIG. 4 is a detailed diagram showing the configuration of a physical one-way communication unit shown in FIG. 3.

FIG. 4 is a detailed diagram showing the configuration of the physical one-way communication unit shown in FIG. 3.

The physical one-way communication unit 48 includes a one-way transmission control unit 48a, a physical one-way data transmission unit 48b, a physical one-way data reception unit 48c, a one-way reception control unit 48d, a signal transmission unit 48e, and a signal reception unit 48f.

The one-way transmission control unit 48a basically functions to transfer data, transmitted by a device of the internal network 10, to the physical one-way data transmission unit 48b.

Furthermore, the one-way transmission control unit 48a receives a request received via the signal reception unit 48f, determines whether the request is normal, and transfers the request to the device of the internal network 10.

The physical one-way data transmission unit 48b transmits data, transferred by the one-way transmission control unit 48a, to the physical one-way data reception unit 48c via one-way communication. In this case, data is unable to be transmitted in a reverse direction because a physical line between the physical one-way data transmission unit 48b and the physical one-way data reception unit 48c is not present.

Furthermore, the physical one-way data transmission unit 48b may check whether the physical one-way data reception unit 48c has normally received data using an electrical signal used to check, a reception state from the physical one-way data reception unit 48c. That is, the physical one-way data transmission unit 48b may check whether the physical one-way data reception unit 48c has normally received data by receiving the electrical signal indicative of the reception state from the physical one-way data reception unit 48c and checking the state of the received electrical signal. In this case, if the physical one-way data reception unit 48c has abnormally received the data, the physical one-way data transmission unit 48b may transmit normal data again. Using this, the reliability of data transmission can be guaranteed.

The physical one-way data reception unit 48c may receive data, transmitted by the physical one-way data transmission unit 48b, in a one-way manner, and may notify the physical one-way data transmission unit 48b of whether the data has normally been received using an electrical signal used to check a reception state. Furthermore, the physical one-way data reception unit 48c transmits the received data to the one-way reception control unit 48d.

The one-way reception control unit 48d basically functions to transmit data, received via the physical one-way data reception unit 48c, to the device of the infotainment network 20.

Furthermore, when receiving a request from the device of the infotainment network 20, the one-way reception control unit 48d determines whether the request is normal, and transfers a request command to the signal transmission unit 48e.

The signal transmission unit 48e receives the request command from the one-way reception control unit 48d, and determines whether the request is normal again. Furthermore, the signal transmission unit 48e sets the state of an electrical signal based on the result of the determination and transfers the request to the signal reception unit 48f.

The signal reception unit 48f determines whether the request is normal by checking the state of the electrical signal from the signal transmission unit 48e. Furthermore, if the received request is normal, the signal reception unit 48f transmits the request to the one-way transmission control unit 48a.

The embodiment of the present invention may have a physical one-way data communication structure because it has a series of the aforementioned structures, and may transfer a limited request.

Furthermore, when the aforementioned structure is applied to a vehicle network system, the security of a vehicle against an external threat can be guaranteed because the internal network 10 of a vehicle and the infotainment network 20 can be more completely separated, and the convenience of the application of technology can be improved because information about the state of the vehicle can be easily transferred.

Figure 5:
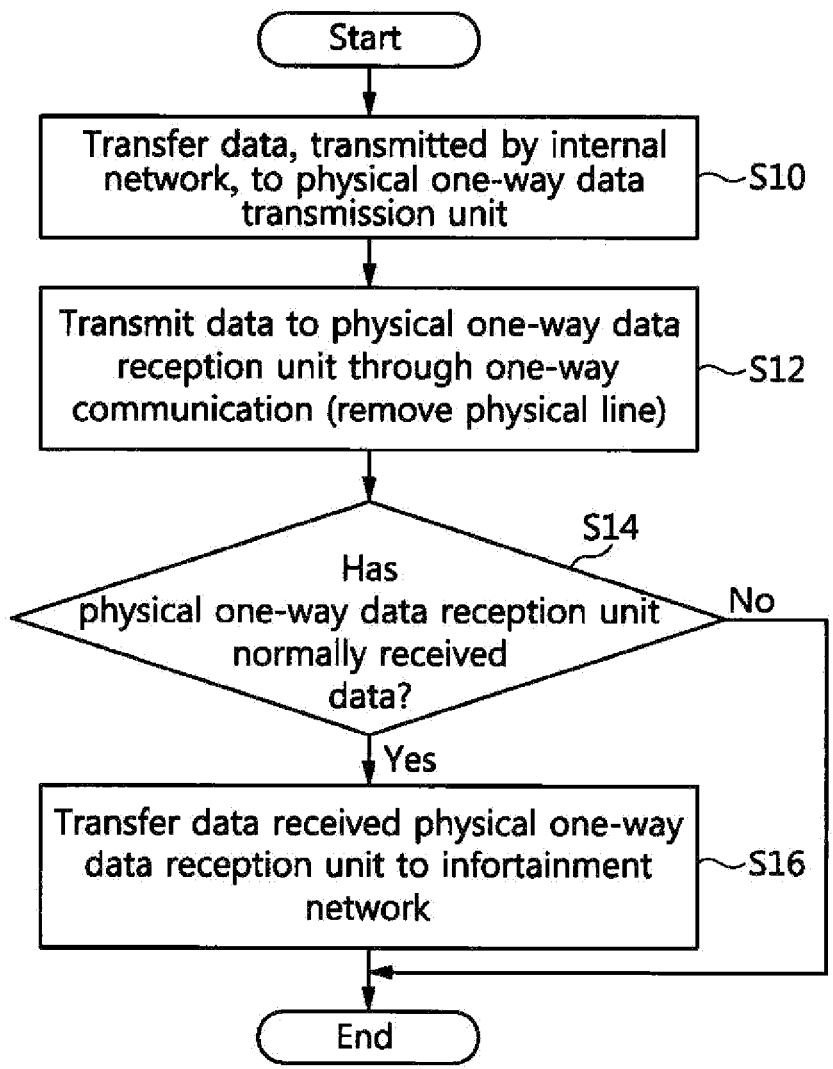
FIGS. 5 and 6 are flowcharts showing a method of protecting networks within a vehicle according to an embodiment of the present invention.
Figure 6:
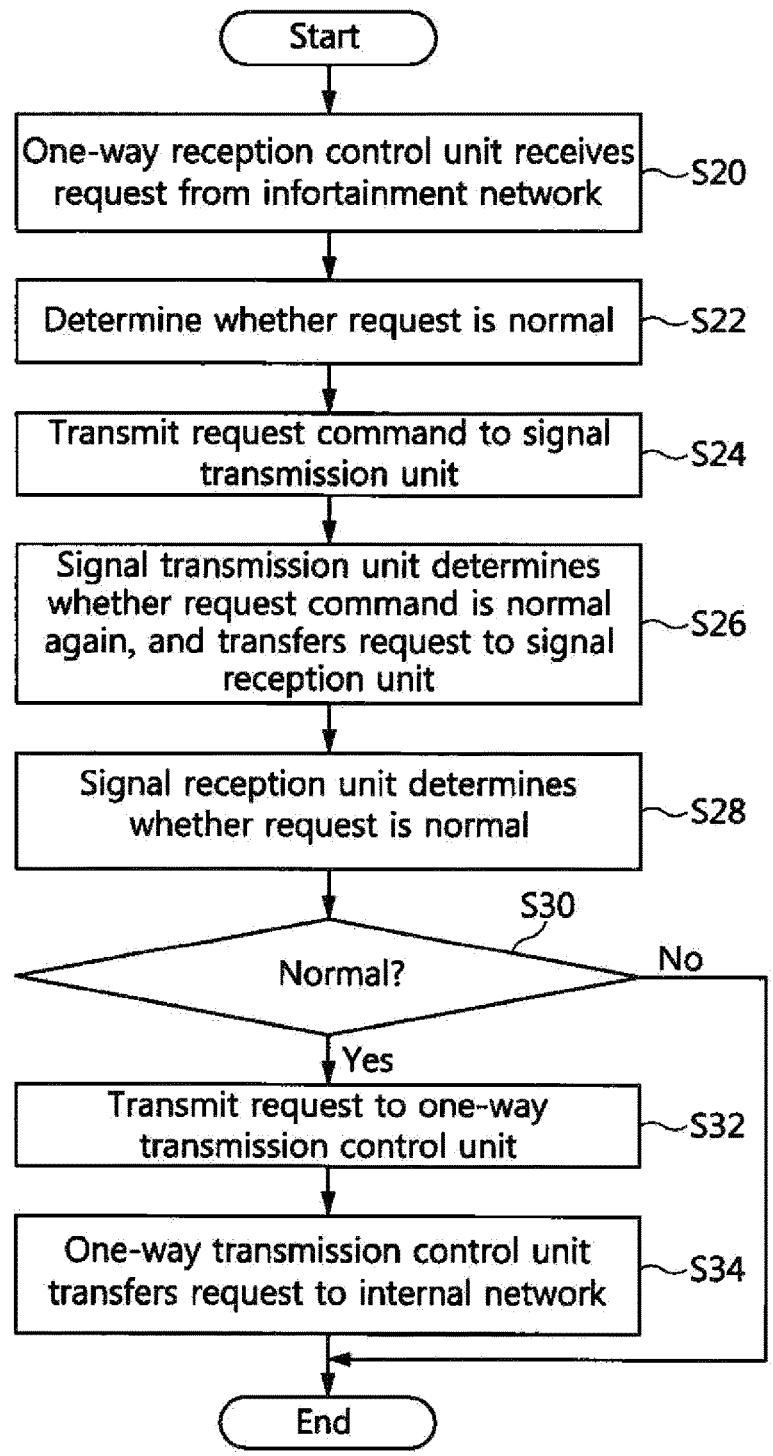

FIGS. 5 and 6 are flowcharts showing a method of protecting networks within a vehicle according to an embodiment of the present invention.

First, the operation of removing an external penetration path while maintaining the provision of information from the internal network 10 to the infotainment network 20 is described with reference to FIG. 5.

Data output by a device (e.g., one of the ECM 10a, the BCM 10b, the TCM 10c, and the ABCM 10d) of the internal network 10 is transmitted to the one-way gateway 30. In response thereto, the one-way transmission control unit 48a of the one-way gateway 30 transfers the data, transmitted by the device of the internal network 10, to the physical one-way data transmission unit 48b at step S10.

The physical one-way data transmission unit 48b transmits the data from the one-way transmission control unit 48a to the physical one-way data reception unit 48c via one-way communication at step S12. In this case, data is not transmitted in a reverse direction because removes a physical line to a counterpart is not present, in the physical one-way data transmission unit 48b or the physical one-way data reception unit 48c.

Furthermore, the physical one-way data reception unit 48c transmits an electrical signal used to check a reception state to the physical one-way data transmission unit 48b. The physical one-way data transmission unit 48b may check whether the physical one-way data reception unit 48c has normally received the data using the electrical signal that is used to check a reception state and is received from the physical one-way data reception unit 48c.

If, as a result of the checking, the physical one-way data reception unit 48c is found to have received normal data ("Yes" at step S14), the physical one-way data reception unit 48c transmits the data from the physical one-way data transmission unit 48b to the one-way reception control unit 48d. In response thereto, the one-way reception control unit 48d transfers the received data to the device (e.g., one of the audio radio 20a, the navigator 20b, the vehicle computer 20c, and external communication 20d) of the infotainment network 20 at step S16.

According to the above-described operation, the right to control a vehicle against malicious behavior can be secured by removing an external penetration path while maintaining the provision of information from the internal network 10 to the infotainment network 20. Accordingly, the security of a driver and a passenger can be protected.

The operation of transmitting only a limited request to the internal network 10 is described below with reference to FIG. 6.

The one-way reception control unit 48d receives a request from a device of the infotainment network 20 at step S20.

The one-way reception control unit 48d determines whether the request is normal at step S22, and transmits a request command to the signal transmission unit 48e at step S24.

In, response thereto, the signal transmission unit 48e determines whether the received request command is normal again, sets a state indicative of whether the request command is normal or abnormal, and transfers the request to the signal reception unit 48f via the electrical signal in which the state has been set at step S26.

The signal reception unit 48f determines whether the request is normal by checking the state of the electrical signal at step S28.

If it is determined that the request is normal ("Yes" at step S30), the signal reception unit 48f transmits the request to the one-way transmission control unit 48a at step S32. That is, the signal reception unit 48f transmits only a predetermined normal request to the one-way transmission control unit 48a.

The one-way transmission control unit 48a determines whether the received request is normal and then transfers the request to a device of the internal network 10 at step S34. In this case, the one-way transmission control unit 48a may transmit only a predetermined normal request to the device of the internal network 10.

Figure 7:
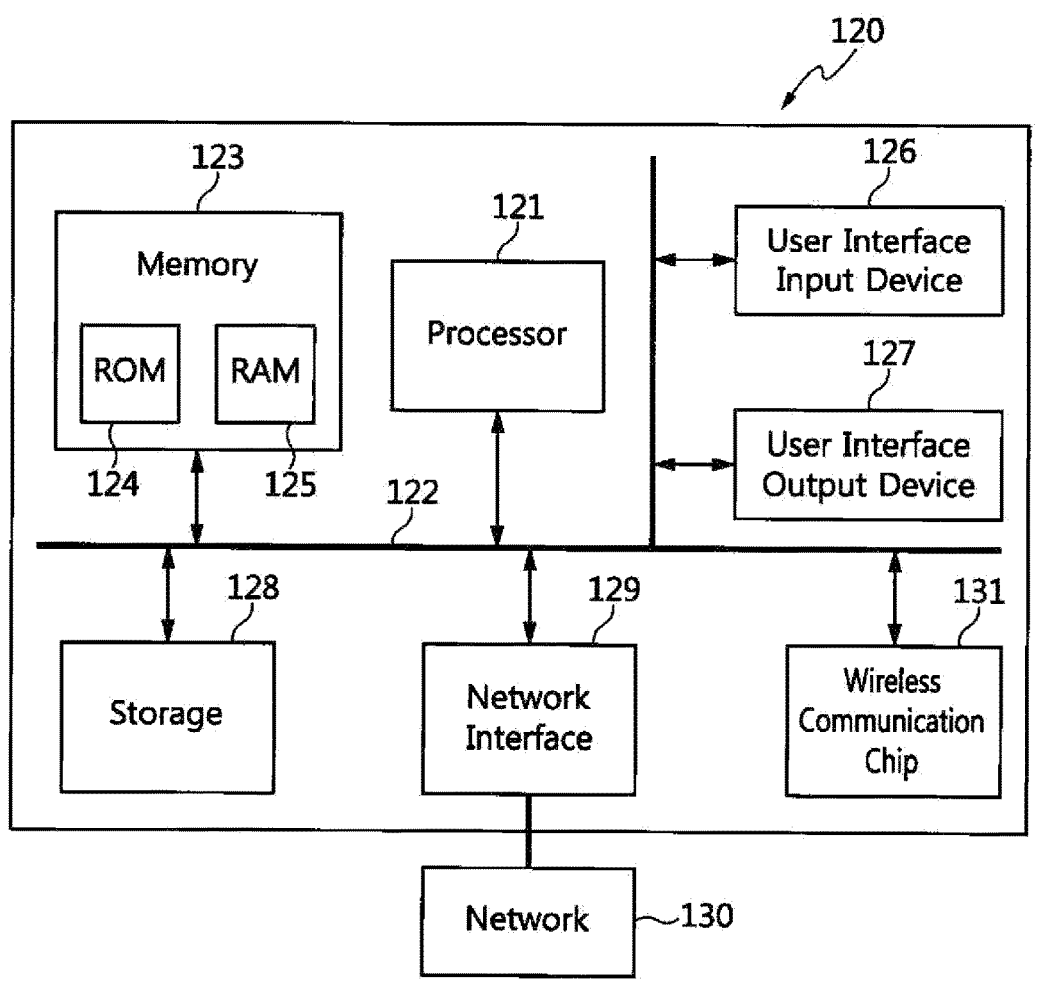
FIG. 7 is a diagram showing a computer system in which an embodiment of the present invention has been implemented.

Meanwhile, the above-described embodiment of the present invention may be implemented in a computer system. As shown in FIG. 7, a computer system 120 may include at least one processor 121, memory 123, a user interface input device 126, a fuser interface output device 127, and storage 128, which communicate with each other over a bus 122. The computer system 120 may further include at least one network interface 129 connected to a network 130. The processor 121 may be a central processing unit or a semiconductor device that executes processing instructions stored in the memory 123 or storage 128. The memory 123 and the storage 128 may be various types of volatile or nonvolatile storage media. For example, the memory 123 may include ROM 124 or RAM 125.

Furthermore, in the case where the computer system 120 is implemented as a small-sized computing device in preparation for the Internet of Things (IoT) era, when an Ethernet cable is connected to the computing device, the computing device operates like a wireless sharer, a mobile device may be wirelessly connected to a gateway, and the computing device can perform encryption and decryption functions. For this purpose, the computer system 120 may further include a wireless communication chip (a WiFi chip) 131.

Accordingly, the embodiment of the present invention may be implemented as a non-transient computer-readable medium in which a computer implemented method or computer executable instructions have been stored. When computer-readable instructions are executed by a processor, the computer-readable instructions may perform a method according to at least one embodiment of the present invention.

As described above, according to at least one embodiment of the present invention, the internal network and infotainment network of a vehicle can be separated via a limited physical one-way communication technology. Accordingly, a threat attributable to external malicious behavior can be fundamentally blocked, and existing associated information can be smoothly provided. Furthermore, the security of a vehicle driver and passenger can be protected.

That is, the right to control a vehicle against malicious behavior can be secured by removing an external penetration path while maintaining the provision of information from the internal network to the infotainment network. Accordingly, the security of a driver and a passenger can be protected. Furthermore, it is possible to transmit a limited request to the internal network while maintaining the advantages thereof, and thus it is possible to deal with various functions.

As described above, the exemplary embodiments have been disclosed in the present specification and the accompanying drawings. Although the specific terms have been used herein, they have been used merely for the purpose of describing the present invention, but have not been used to restrict the meanings thereof or limit the scope of the present invention set forth in the attached claims. Accordingly, it will be appreciated by those having ordinary knowledge in the relevant technical field that various modifications and other equivalent embodiments can be made. Therefore, the true range of protection of the present invention should be defined based on the technical spirit of the attached claims.

What is claimed is:

1. A one-way gateway comprising:
    a communication controller which takes charge of communication with a device of an internal network or infotainment network of a vehicle;
    a physical one-way communicator which is adapted to configure a communication section between the internal network and the infotainment network in a physically one-way form; and
    a data transmitter/receiver which transfers data, transmitted by the device of the internal network or infotainment network, to the physical one-way communicator via the communication controller, and transfers data, received via the physical one-way communicator, to the device of the internal network or infotainment network,
    wherein the physical one-way communicator comprises:
    a one-way transmission controller which receives the data from the device of the internal network and outputs the received data;
    a physical one-way data transmitter which receives the data from the one-way transmission controller via one-way communication and outputs the received data;
    a physical one-way data receiver which receives the data from the physical one-way data transmitter via the one-way communication and outputs the received data; and
    a one-way reception controller which transfers the data from the physical one-way data, receiver to the device of the infotainment network.

2. The one-way gateway of claim 1, wherein when one-way data communication is performed between the physical one-way data transmitter and the physical one-way data receiver, a physical line between the physical one-way data transmitter and the physical one-way data receiver is removed.

3. The one-way gateway of claim 1, wherein the physical one-way data receiver transmits a reception state checking signal to the physical one-way data transmitter as the data is received from the physical one-way data transmitter.

4. The one-way gateway of claim 3, wherein the physical one-way data transmitter checks whether the physical one-way data receiver has normally received the data based on the reception state checking signal.

5. A one-way gateway comprising:
    a communication controller which takes charge of communication with a device of an internal network or infotainment network of a vehicle;
    a physical one-way communicator which is adapted to configure a communication section between the internal network and the infotainment network in a physically one-way form; and
    a data transmitter/receiver which transfers data, transmitted by the device of the internal network or infotainment network, to the physical one-way communicator via the communication controller, and transfers data, received via the physical one-way communicator, to the device of the internal network or infotainment network;
    wherein the physical one-way communicator comprises:
    a one-ways reception controller;
    a one-way transmission controller;
    a signal transmitter which determines whether a request is normal when the request is received from the device of the infotainment network via the one-way reception controller and output a reception state checking signal based on a result of the determination; and
    a signal receiver which determines whether the request is normal based on the reception state checking signal from the signal transmitter and transmits the request to the one-way transmission controller if the request is normal.

6. The one-way gateway of claim 5, wherein:
    the one-way reception controller determines whether the request is normal when the request is received from the device of the infotainment network and transfers the request to the signal transmitter; and
    the one-way transmission controller receives the request from the signal receiver, determines whether the request is normal, and transfers the request to the device of the internal network.

7. A method of protecting networks within a vehicle, comprising:
    transferring, by a one-way transmission controller of a one-way gateway, data from a device of an internal network to a physical one-way data transmitter of the one-way gateway;
    transferring, by the physical one-way data transmitter, the received data to a physical one-way data receiver of the one-way gateway through one-way communication;
    transferring, by the physical one-way data receiver, the data from the physical one-way data transmitter to a one-way reception controller of the one-way gateway; and
    transferring, by the one-way reception controller, the data from the one-way reception controller to a device of an infotainment network.

8. The method of claim 7, wherein transferring the received data to the physical one-way data receiver comprises removing a physical line between the physical one-way data transmitter and the physical one-way data receiver.

9. The method of claim 7, further comprising, between transferring the received data to the physical one-way data receiver and transferring the data to the one-way reception controller, transmitting, by the physical one-way data receiver, a reception state checking signal to the physical one-way data transmitter as the physical one-way data receiver receives the data from the physical one-way data transmitter.

10. The method of claim 9, further comprising checking, by the physical one-way data transmitter, whether the physical one-way data receiver has normally received data based on the reception state checking signal.

11. The method of claim 7, further comprising:
determining, by a signal transmitter of the one-way gateway, whether a request is normal as the request is received from the device of the infotainment network via the one-way reception controller;
outputting, by the signal transmitter, a reception state checking signal based on a result of the determination;
determining, by a signal receiver of the one-way gateway, whether the request is, normal based on the reception state checking signal of the signal transmitter; and
transferring, by the signal receiver, the request to the one-way transmission controller if the request is normal.

12. The method of claim 11, further comprising, before determining whether the request is normal as the request is received from the device of the infotainment network:
determining, by the one-way reception controller, whether a request is normal as the request is received from the device of the infotainment network; and
transferring the request to the signal transmitter.

13. The method of claim 12, further comprising, after transferring the request to the one-way transmission controller if the request is normal:
receiving, by the one-way transmission controller, the request from the signal receiver;
determining whether the request is normal; and
transferring the request to the device of the internal network.

* * * * *